United States Patent [19]

Illmann et al.

[11] 3,983,057
[45] Sept. 28, 1976

[54] PROCESS FOR THE MANUFACTURE OF WATER-CLEAR COPOLYMER DISPERSIONS

[75] Inventors: Günther Illmann; Norbert Mayer, both of Augsburg, Germany

[73] Assignee: Hoechst Aktiengesellschaft, Frankfurt am Main, Germany

[22] Filed: Oct. 30, 1974

[21] Appl. No.: 519,240

[30] Foreign Application Priority Data
Nov. 2, 1973 Germany............................ 2354680

[52] U.S. Cl. ..................... 260/29.6 TA; 260/29.6 Z
[51] Int. Cl.$^2$ .......................................... C08L 31/02
[58] Field of Search ...... 260/80.8, 29.6 H, 29.6 TA, 260/29.6 Z, 29.6 MQ

[56] References Cited
UNITED STATES PATENTS

| | | | |
|---|---|---|---|
| 2,787,561 | 4/1957 | Sanders | 260/29.6 MQ |
| 3,011,988 | 12/1961 | Luedke | 260/29.6 TA |
| 3,389,110 | 6/1968 | Taft | 260/29.6 MQ |
| 3,677,991 | 7/1972 | Moore | 260/29.6 TA |
| 3,728,295 | 4/1973 | Skinner | 260/29.6 TA |

Primary Examiner—Paul R. Michl
Attorney, Agent, or Firm—Connolly and Hutz

[57] ABSTRACT

Copolymer dispersions can be prepared by emulsion polymerization of mixtures of unsaturated carboxylic acids and the esters thereof in the presence of regulators. Using sulfur containing compounds as regulators odorless and colorless dispersions which do not discolor are obtained if mercapto compounds having at least two SH-groups are used as regulator and the dispersions after polymerization are treated with hydrogen peroxide. The dispersions are especially suitable as film forming component in dry bright emulsions for the care of floors.

2 Claims, No Drawings

PROCESS FOR THE MANUFACTURE OF WATER-CLEAR COPOLYMER DISPERSIONS

This invention relates to a process for the manufacture of aqueous copolymer dispersions suitable for making floor polishes.

Modern floor polishes contain as important component copolymer dispersions of the glossy-drying type, i.e. aqueous dispersions on the basis of styrene and acrylate polymers which dry on the floor with the formation of a glossy film.

A special group of these dry bright copolymer dispersions are the water-clear dry bright dispersions (cf. German Offenlegungsschriften Nos. 1,811,012, 1,811,247 and 1,936,830). They contain emulsion polymers of mixtures of esters of acrylic and methycrylic acid and the free acids prepared by polymerization in the presence of so-called "regulators". By the addition of ammonia dilute aqueous dispersions of this type become water-clear and transparent. The presence of regulators in the polymerization is necessary to obtain polymers having a reduced molecular weight because only then the transparent dispersion has the desired low viscosity. Dispersions which have been prepared without the addition of a regulator solidify to a jelly-like mass when ammonia is added and, therefore, they are unsuitable for the indicated purpose.

Known regulators are polyhalogenated compounds and mercaptans. From among the polyhalides only those containing at least one bromine atom in the molecule, for example bromotrichloromethane, have a sufficient reactivity.

Copolymer dispersions prepared with bromine containing regulators take a more and more brownish tint on standing for a prolonged period of time under the action of daylight, probably owing to the bromine atom incorporated into the polymer molecule.

From among the mercaptans proposed as regulators and carrying a single mercapto group in the molecule the alkane derivatives of low molecular weight are quite effective but they have the drawback of an unpleasant specific odor. Mercaptans with a long chain alkane radical, for example dodecyl mercaptan, are sparingly volatile and therefore they smell much less, but the dispersions prepared therewith cannot be rendered completely transparent. It can be assumed that the hydrophobic alkane radical of the mercaptan which is incorporated into the polymer molecule in the polymerization affects the swelling properties of the polymer particles in the ammoniacal water so that fully transparent dispersions cannot be obtained. Moreover, polymer dispersions prepared with dodecyl mercaptan are not free from a mercaptan smell. Finally, copolymer dispersions prepared with mercaptans as regulator are all yellowish after the addition of ammonia.

The discoloration as well as the unpleasant odor are detrimental properties which are, of course, highly undesired.

It has now been found that odorless and colorless polymer dispersions on acrylate basis, which do not have the tendency to discolor and which can be rendered water-clear, can be prepared using as polymerization regulator a mercapto compound having at least 2 SH groups in the molecule and treating the dispersion after completion of the polymerization with hydrogen peroxide.

Hence, the present invention provides a process for the manufacture of an odorless and colorless copolymer dispersion on acrylate basis, which does not discolor and can be rendered water-clear by the addition of ammonia, by polymerizing a mixture of acrylates, methacrylates, unsaturated acids and optionally a small amount of styrene in the presence of a mercapto compound as regulator, which comprises a. polymerizing the monomers in tbe presence of from 0.1 to 5.0 % by weight, calculated on the weight of the monomers, of a mercapto compound having at least two SH groups in the molecule as regulator and b. incorporating into the copolymer dispersion from 0.1 to 5.0 % by weight of hydrogen peroxide, calculated as $H_2O_2$ of 100 % strength and on the weight of the monomers, at a temperature of from 60° to 95°C after completion of the polymerization.

It could not have been foreseen that also mercapto compounds having at least 2 SH groups in the molecule would be suitable as regulator in the manufacture of copolymer dispersions that can be rendered water-clear because mercaptans having at least 2 SH groups in the molecule, on the one hand, have a chain interrupting effect in the polymerization initiated by free radicals, but, on the other hand, they partially have a cross linking action.

Each mercapto group transfers a hydrogen atom to a growing polymer radical and the formation of a new polymer chain starts at the remaining sulfur radical. Hence, polymer dispersions prepared with bi- or polyvalent mercapto compounds contain a proportion of particles having the double or even a multiple of the mean molecular weight of the other polymer particles. It is surprising that inspite of this function to increase the molecular weight, which is contradictory to the proper regulator effect, copolymer dispersions prepared with regulators of this type are not only equal but even superior to dispersions prepared with the usual regulators in that after the treatment with hydrogen peroxide the diluted dispersions exhibit a particularly high transparency and are practically free from any odor.

Copolymer dipsersions on the basis of acrylate are meant to include dispersions of copolymers which are preferably composed of acrylates, methacrylates and unsaturated acids and optionally small amounts of styrene, which dispersions are prepared in known manner by emulsion polymerization of said monomers in the presence of mercapto compounds used as regulator, emulsifiers and initiators yielding free radicals, for example as described in German Offenlegungsschrift No. 1,811,247.

Mercapto compounds having at least two SH groups in the molecule to be used as regulator are polyvalent aliphatic mercaptans, preferably those having from 2 to 5 carbon atoms in the molecule, for example dithioethylene glycols, trithioglycerol and thio-pentaerythritol; esters of polyhydric aliphatic alcohols having from 2 to 6 carbon atoms with mercaptomonocarboxylic acids also having from 2 to 6 carbon atoms, for example mercapto-acetic acid, β-mercapto-propionic acid and ω-mercapto-valeric acid, more particularly glycol-dimercaptoacetate, glycol-dimercapto-propionate, triglycol-dimercaptoacetate and butanediol-1,4-dimercapto-acetate. From among the aforesaid compounds dimercaptans are preferred, especially glycol-dimercapto-acetate and propionate.

The mercaptans are used in an amount of from 0.1 to 5.0 % by weight, calculated on the amount of monomers used.

The after-treatment of the aqueous-copolymer dispersions obtained with hydrogen peroxide is carried out at a temperature in the range of from about 60° to 95°C. Commercial hydrogen peroxide of 30 % strength is preferably used. However, more dilute or concentrated peroxide solutions may also be used. The required amount ranges from 0.1 to 5.0 % by weight of 100 % $H_2O_2$, calculated on the monomer mixture used.

It is essential to carry out the after-treatment at the indicated higher temperatures. If the hydrogen peroxide is added at room temperature a certain brightening effect is observed and the odor is improved, but only after some days and to a minor extent. Acceptable results are also obtained with higher amounts of hydrogen peroxide, but in this case oxygen separates gradually from the surplus $H_2O_2$ causing the formation of a considerable and possibly dangerous overpressure in the containers in which the dispersions are stored.

By the treatment with hydrogen peroxide the remaining traces of the mercaptan are completely oxidized and yield oxidation products having a neutral odor and, moreover, intensely colored purities are bleached. Additionally, the smell of residual monomers is weakened and the transparency of the diluted dispersion is distinctly improved, a phenomenon which may be explained by the oxidation of the hydrophobic sulfides, disulfides or the colloidally separated sulfur formed from the mercaptans by secondary reactions to hydrophilic sulfoxides, sulfones and sulfonic acids.

To carry out the process of the invention the monomer mixture is first polymerized in known manner using the specified regulators and, preferably directly after completion of the polymerization, the hot copolymer dispersion is mixed with the hydrogen peroxide, the hot mixture is stirred for 15 to 30 minutes and then allowed to cool to room temperature.

The color- and odor-less aqueous copolymer dispersions obtained by the process of the invention, which generally have a solids content of about 40 % and contain sulfoxide and sulfonyl groups incorporated in the polymer molecules, are particularly suitable as film-forming component in dry bright emulsions. For the treatment of floors they are preferably used in the form of 15 % dispersions rendered transparent by addition of ammonia. They can also be used in transparent floor cleaning agents having a polishing effect and in shoe polishes.

The following examples illustrate the invention.

EXAMPLE 1

A 2 liter Witt's vessel provided with blade stirrer and inside thermometer was charged with a solution of 12.5 g of the triethanol-amine salt of octadecanol-sulfuric acid semiester in 700 g of deionized water and the solution was heated to 80°C. At this temperature a solution of 1.5 g of ammonium persulfate in 30 g of water was added. Next, a mixture consisting of 280 g (56 %) of methylmethacrylate
75 g (15 %) of butyl acrylate
75 g (15 %) of ethyl acrylate
70 g (14 %) of methacrylic acid
500 g (100 %) and
2.5 g (0.5 %) of thio-glycerol were added dropwise and uniformly during the course of 2 hours at 80°C. When the monomer addition was terminated, 0.15 g of ammonium peroxy-disulfate dissolved in 20 g of water was added and the dispersion was stirred for a further 2 hours at 80°C. Then, for comparison, a sample of about 100 g of dispersion was taken and to the remaining portion 5 g of hydrogen peroxide of 30 % strength (0.3 % $H_2O_2$ calculated on the weight of the monomers were added dropwise whereupon stirring of the dispersion was continued for 15 minutes at 80°C.

After cooling to room temperature, a pure white polymer dispersion having a solids content of 40 % by weight which was free from any mercaptan smell was obtained. As compared therewith, the sample taken before the peroxide treatment had an intensely yellow color and a pungent mercaptan smell.

37.5 g each of the final product and the comparative sample were stirred with 60 g of hot water and 2.5 g of concentrated ammonia solution, whereby transparent polymer dispersions having a solids content of about 15 % by weight were obtained.

The dispersion prepared with the comparative sample was slightly turbid and yellowish and had a mercaptan smell whereas the dispersion treated in accordance with the invention was absolutely water-white and clear without any coloration and odor. Neither the 40 % polymer dispersion nor the transparent 15 % dispersion showed a tendency to discolor during storage.

EXAMPLES 2 to 5

Dispersions were prepared in the same manner as described in Example 1 with the exception that instead of thioglycerol 2.5 g each of the thioglycol, glycol-dimercapto-acetate, glycol-dimercapto-propionate and thio-pentaerythritol were used. In all cases the results obtained corresponded to those of Example 1.

EXAMPLE 6

This example is intended to demonstrate the formation of sulfoxide and sulfonyl groups in the polymer molecules by the treatment according to the invention. Owing to the fact that the ester-carbonyl absorption of the poylacrylates is situated in the range of the S=O oscillations, polystyrene latex was chosen as test substance in order to avoid an overlapping of S=O absorption bands of sulfoxide and sulfonyl groups.

250 g of styrene were mixed with 5 g (2 % by weight) of thio-glycol and the mixture was dropped at 80°C into a solution of 1.25 g (0.5 %) of the triethyl amine salt of octadecanol sulfuric acid semi-ester and 2.5 g (1.0 %) of ammonium persulfate in 974 g of water, during the course of 7 hours and while stirring. After the addition stirring was continued for a further 2 hours. Next, 12.5 g (1.5 %) of hydrogen peroxide of 30 % strength were added and the mixture was stirred for a further 15 minutes at 80°C. After cooling to room temperature, part of the polymer latex was allowed to dry up. The IR spectrum of the dry polymer showed absorption bands in the range of the sulfoxide and sulfonyl oscillations.

What is claimed is:

1. A process for the manufacture of an odorless and colorless aqueous copolymer dispersion which can be rendered water-clear by the addition of ammonia and does not discolor by polymerizing acrylates, methacrylates, unsaturated acids and optionally a small amount of styrene in the presence of a mercapto compound as regulator, which comprises
  a. polymerizing the monomers in the presence of from 0.1 to 5.0 % by weight, calculated on the weight of the monomers, of a mercapto compound having at least 2 SH groups in the molecule as regulator and
  b. incorporating into the copolymer dispersion of from 0.1 to 5.0 % of hydrogen peroxide, calculated as $H_2O_2$ of 100 % strength on the weight of the monomers, at a temperature of from 60° to 95°C after completion of the polymerization.

2. The process as claimed in claim 1, wherein the mercapto compound having at least 2 SH groups in the molecule used as regulator is a thioglycol, thioglycerol, thio-pentaerythritol, or an ester of a saturated polyhydric aliphatic alcohol having from 2 to 6 carbon atoms with a saturated aliphatic mercapto monocarboxylic acid having from 2 to 6 carbon atoms.

* * * * *